United States Patent
Sun et al.

(10) Patent No.: US 11,622,382 B2
(45) Date of Patent: Apr. 4, 2023

(54) TECHNIQUES FOR RANDOM ACCESS CHANNEL (RACH) SUPPORT FOR NEW RADIO UNLICENSED (NR-U) COMMUNICATIONS

(71) Applicant: QUALCOMM Incorporated, San Diego, CA (US)

(72) Inventors: Jing Sun, San Diego, CA (US); Xiaoxia Zhang, San Diego, CA (US); Amir Aminzadeh Gohari, Sunnyvale, CA (US); Stefan Brueck, Neunkirchen am Brand (DE)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 17/089,288

(22) Filed: Nov. 4, 2020

(65) Prior Publication Data

US 2021/0144759 A1 May 13, 2021

Related U.S. Application Data

(60) Provisional application No. 62/933,202, filed on Nov. 8, 2019.

(51) Int. Cl.
*H04W 74/08* (2009.01)
*H04W 16/14* (2009.01)
*H04W 84/04* (2009.01)

(52) U.S. Cl.
CPC ........ *H04W 74/0808* (2013.01); *H04W 16/14* (2013.01); *H04W 84/042* (2013.01)

(58) Field of Classification Search
CPC ............. H04W 74/0808; H04W 16/14; H04W 84/042; H04W 74/0833; H04L 5/0044; H04L 27/0006
USPC ........................................................ 370/329
See application file for complete search history.

(56) References Cited

U.S. PATENT DOCUMENTS

| | | | |
|---|---|---|---|
| 2017/0223695 A1* | 8/2017 | Kwak | H04L 1/1861 |
| 2019/0260533 A1* | 8/2019 | Manolakos | H04W 24/10 |
| 2020/0267774 A1* | 8/2020 | Vos | H04L 5/0048 |
| 2021/0014694 A1* | 1/2021 | Li | H04W 80/08 |
| 2022/0191935 A1* | 6/2022 | Xiong | H04W 16/14 |

OTHER PUBLICATIONS

3GPP Draft; R1-1911093, "Pther consideration of Two-StepRACH", Oct. 2019, Five pages.*

(Continued)

*Primary Examiner* — Kwang B Yao
*Assistant Examiner* — Syed M Bokhari
(74) *Attorney, Agent, or Firm* — Changwoo Yang (57) ABSTRACT

This disclosure relates to random access channel (RACH) enhancements for new radio unlicensed (NR-U) communications. Specifically, the present aspects include determining whether a gap length between a two-step random access channel (RACH) preamble transmission and a physical uplink shared channel (PUSCH) transmission satisfies a gap condition. The present aspects further include selecting a transmission procedure associated with the determined gap length for the PUSCH transmission. The present aspects further include performing the PUSCH transmission in accordance with the selected transmission procedure.

26 Claims, 8 Drawing Sheets

(56) References Cited

OTHER PUBLICATIONS

3GPP Draft; R1-1911093 , "Other consideration for Two-Step RACH", Oct. 2019, Five pages.*
International Search Report and Written Opinion—PCT/US2020/059147—ISA/EPO—dated Jan. 28, 2021.
LG Electronics: "Channel Access Procedure for NR-U", 3GPP Draft, 3GPP TSG RAN WG1 Meeting #98bis, R1-1910819, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 8, 2019 (Oct. 8, 2019), XP051809209, 15 Pages, Retrieved from the Internet: URL: https://ftp.3gpp.org/tsg_ran/WG1_RL1/TSGR1_98b/Docs/R1-1910819.zip. R1-1910819.doc [retrieved on Oct. 8, 2019] Section 1. section 2.2. figure 6.
QUALCOMM Incorporated: "Other Considerations for Two-Step RACH", 3GPP Draft, 3GPP TSG-RAN WG1 Meeting #98bis, R1-1911093, Other Considerations for Two-Step RACH, 3rd Generation Partnership Project (3GPP), Mobile Competence Centre, 650, Route Des Lucioles, F-06921 Sophia-Antipolis Cedex, France, vol. RAN WG1, No. Chongqing, P.R. China, Oct. 14, 2019-Oct. 20, 2019, Oct. 5, 2019 (Oct. 5, 2019), XP051808832, 5 Pages, Retrieved from the Internet: URL: https://ftp.3gpp.org/tsg_ran/WG1_RL1/TSGR1_98b/Docs/R1-1911093.zip. R1-1911093 Other Considerations for Two-Step RACH.docx [retrieved on Oct. 5, 2019] the whole document.
ZTE Corporation: et al., "LBT Aspects of MSGA Transmission", 3GPP Draft, 3GPP RAN2#108, R2-1914790, 3rd Generation Partnership Project (3GPP), Mobile Competence Centre, 650, Route Des Lucioles, F-06921 Sophia-Antipolis Cedex, France, vol. RAN WG2 No. Reno, USA, Nov. 18, 2019-Nov. 22, 2019, Nov. 7, 2019 (Nov. 7, 2019), XP051815760, 4 Pages, Retrieved from the Internet: URL: https://ftp.3gpp.org/tsg_ran/WG2_RL2/TSGR2_108/Docs/R2-1914790.zip. R2-1914790 2-stepRACH LBTaspects.docx [retrieved on Nov. 7, 2019] the whole document.

* cited by examiner

TECHNIQUES FOR RANDOM ACCESS CHANNEL (RACH) SUPPORT FOR NEW RADIO UNLICENSED (NR-U) COMMUNICATIONS

CROSS-REFERENCE TO RELATED APPLICATION(S)

This application claims the benefit of U.S. Provisional Application Ser. No. 62/933,202, entitled "TECHNIQUES FOR RANDOM ACCESS CHANNEL (RACH) SUPPORT FOR NEW RADIO UNLICENSED (NR-U) COMMUNICATIONS" and filed on Nov. 8, 2019, which is expressly incorporated by reference herein in its entirety.

BACKGROUND

Aspects of the present disclosure relate generally to wireless communication systems, and more particularly, to random access channel (RACH) enhancements for new radio unlicensed (NR-U) communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

For example, for various communications technology such as, but not limited to NR, RACH in NR-U implementations may increase transmission speed and flexibility but also transmission complexity. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of wireless communication at a user equipment (UE) is provided. The method may include determining whether a gap length between a two-step random access channel (RACH) preamble transmission and a physical uplink shared channel (PUSCH) transmission satisfies a gap condition, selecting a transmission procedure associated with the determined gap length for the PUSCH transmission, and performing the PUSCH transmission in accordance with the selected transmission procedure.

In a further aspect, the present disclosure includes an apparatus for wireless communication including a memory and at least one processor coupled to the memory. The at least one processor may be configured to determine whether a gap length between a two-step RACH preamble transmission and a PUSCH transmission satisfies a gap condition. The at least one processor may further be configured to select a transmission procedure associated with the determined gap length for the PUSCH transmission. The at least one processor may further be configured to perform the PUSCH transmission in accordance with the selected transmission procedure.

In an additional aspect, the present disclosure includes an apparatus for wireless communication including means for determining whether a gap length between a two-step RACH preamble transmission and a PUSCH transmission satisfies a gap condition. The apparatus may further include means for selecting a transmission procedure associated with the determined gap length for the PUSCH transmission. The apparatus may further include means for performing the PUSCH transmission in accordance with the selected transmission procedure.

In yet another aspect, the present disclosure includes a computer-readable medium storing computer executable code, the code when executed by a processor cause the processor to determine whether a gap length between a two-step RACH preamble transmission and a PUSCH transmission satisfies a gap condition, select a transmission procedure associated with the determined gap length for the PUSCH transmission, and perform the PUSCH transmission in accordance with the selected transmission procedure.

In some implementations, the gap condition may correspond to a gap less than one symbol gap, and the selected transmission procedure at least partially fills the gap with a cyclic prefix extension of a first symbol of the PUSCH transmission.

In some implementations, one or more of the aspects described herein may further include determining that gap cannot be at least partially filled with the cyclic prefix extension, and rendering at least one resource associated with the gap as invalid.

In some implementations, a remaining gap length may be less than 16 microseconds.

In some implementations, the gap condition may correspond to a gap greater than two symbols, and the selected transmission procedure perform a Category 4 listen-before-talk (LBT) within the gap prior to the PUSCH transmission.

In some implementations, the gap condition may correspond to a gap greater than 1 symbol and less than two symbols, and the selected transmission procedure renders the two-step RACH transmission and the PUSCH transmission as invalid.

In some implementations, the gap length may be measured from a last non-zero sample from the two-step RACH preamble transmission to a beginning of the PUSCH transmission.

In some implementations, performing the PUSCH transmission may include configuring the PUSCH transmission with a physical random access channel (PRACH) format C2, and wherein a first symbol of the PUSCH transmission overlaps with a last symbol of the PRACH format C2.

In some implementations, one or more of the aspects described herein may include identifying a location of a transient period, the transient period representing a potential degradation of waveform quality over a number of samples.

In some implementations, the location of the transient period may be at a beginning of the PUSCH transmission.

In some implementations, the location of the transient period may be at an end of the two-step RACH preamble transmission.

In some implementations, the location of the transient period may be a function of a configuration of the PUSCH transmission and a format of the two-step RACH preamble transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present application relates to random access channel (RACH) support in new radio (NR) for transmissions using unlicensed spectrum (NR-U). A RACH may be a shared channel used by user equipments (UE) to access a mobile network for call establishment and data transmission bursts. RACH is a transport layer channel, with the associated physical-layer channel corresponding to a PRACH. In NR-U, two-step RACH transmissions may be supported, which may include a preamble transmission followed by a physical uplink shared channel (PUSCH) transmission.

However, the two-step RACH procedure may include a Category 4 listen-before talk (LBT) occasions for each transmission burst if a gap between the two transmission bursts is larger than 16 microseconds, for example. In such scenario, another Category 4 LBT may occur for the second transmission burst. Nonetheless, a gap of varying symbol sizes may exist between the preamble transmission and the PUSCH transmission, which may be able to support another Category 4 LBT procedure. As such, identifying and utilizing the symbol gaps in two-step RACH procedures may be desirable for improved RACH transmissions.

In an implementation, a UE or determine whether a gap length between a two-step RACH preamble transmission and a PUSCH transmission satisfies a gap condition, select a transmission procedure associated with the determined gap length for the PUSCH transmission, and perform the PUSCH transmission in accordance with the selected transmission procedure.

The described features will be presented in more detail below with reference to FIGS. 1-8.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Figure 1:
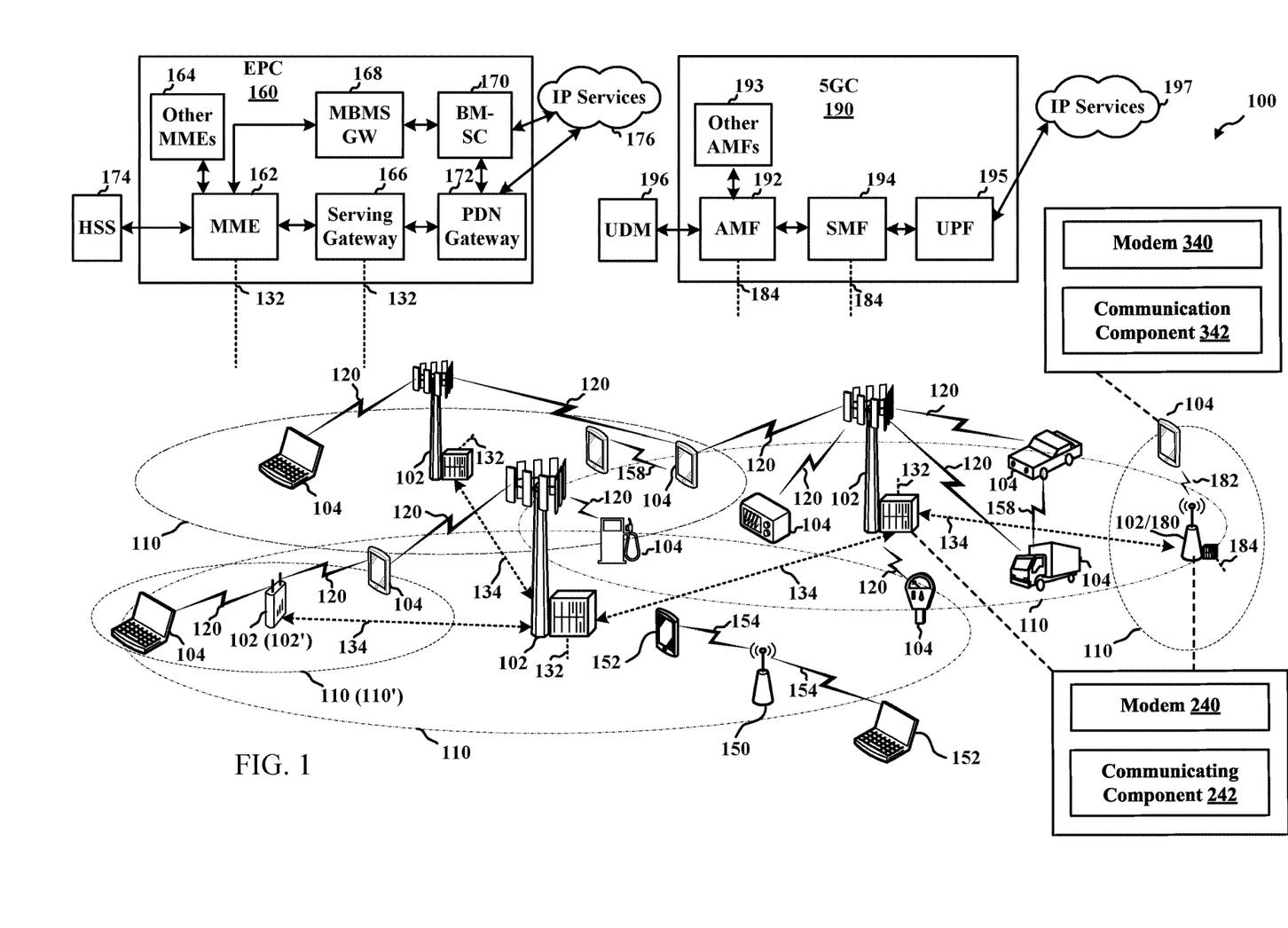
FIG. 1 illustrates an example of a wireless communication system, in accordance with various aspects of the present disclosure.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102, which may also be referred to as network entities, may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, some nodes such as UE 104 of the wireless communication system may have a modem 340 and communicating component 342 for facilitating RACH procedures in an NR-U system, as described herein. In another example, some nodes, such as base station 102/gNB 180, may have a modem 240 and communicating component 242 for facilitating RACH procedures, as described herein. Though a UE 104 is shown as having the modem 340 and communicating component 342 and a base station 102/gNB 180 is shown as having the modem 240 and communicating component 242, this is one illustrative example, and substantially any node or type of node may include a modem 240 and communicating component 242 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). Alternatively, or in addition, the base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 132, 134 and/or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available. The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Turning now to FIGS. 2-8, aspects are depicted with reference to one or more components and one or more methods that may perform the actions or operations described herein, where aspects in dashed line may be optional. Although the operations described below in FIGS. 4-8 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
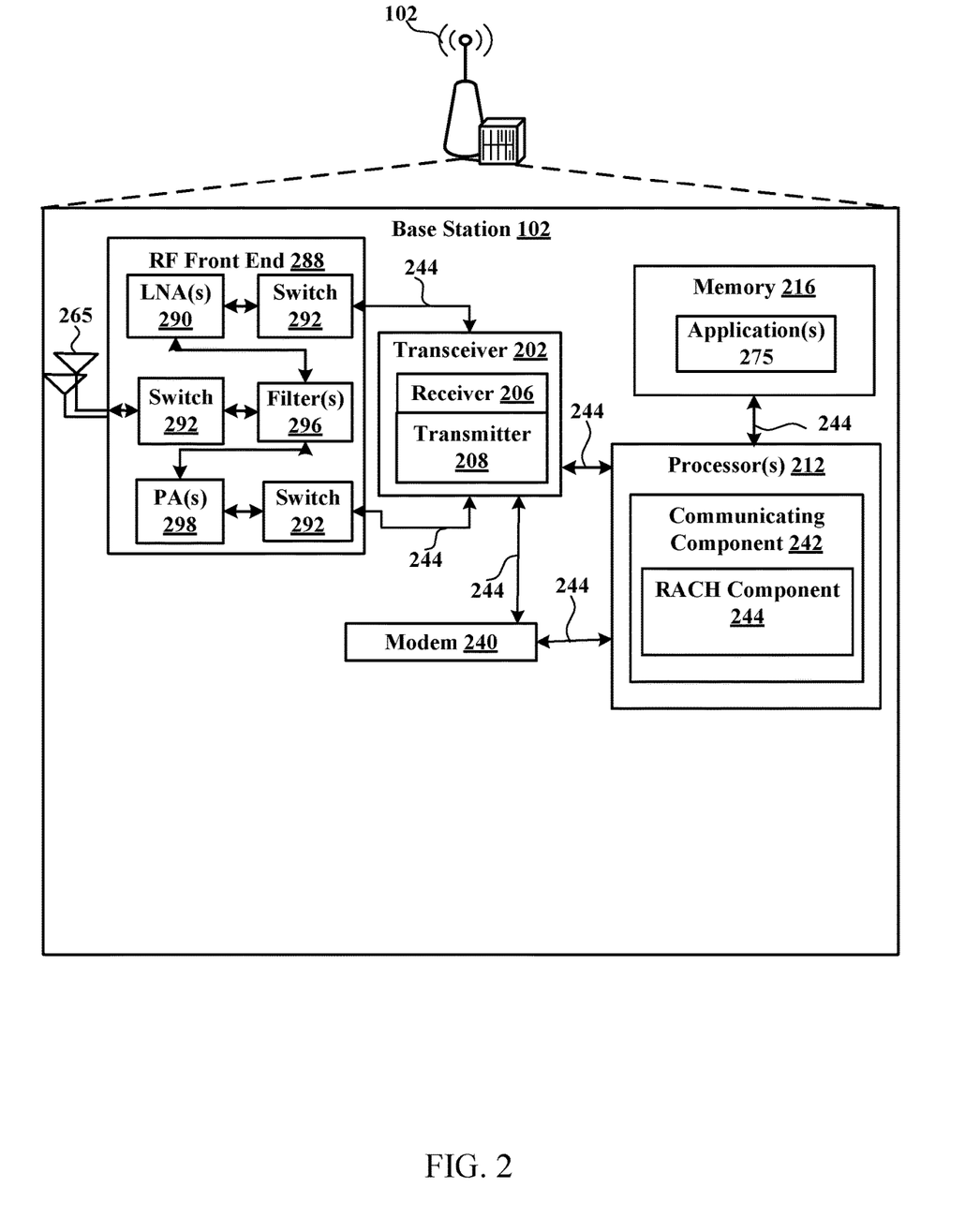
FIG. 2 is a block diagram illustrating an example of a network entity (also referred to as a base station), in accordance with various aspects of the present disclosure.

Referring to FIG. 2, one example of an implementation of a node such as base station 102 (e.g., a base station 102 and/or gNB 180, as described above) may include a variety of components, some of which have already been described above and are described further herein, including components such as one or more processors 212 and memory 216 and transceiver 202 in communication via one or more buses 244, which may operate in conjunction with modem 240 and/or communicating component 242 including RACH component 244 for facilitating RACH procedures in conjunction with a UE such as UE 104.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when base station 102 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, base station 102 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, and/or antenna arrays.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 212 may correspond to one or more of the processors described in connection with the UE in FIG. 9. Similarly, the memory 216 may correspond to the memory described in connection with the UE in FIG. 9.

Figure 3:
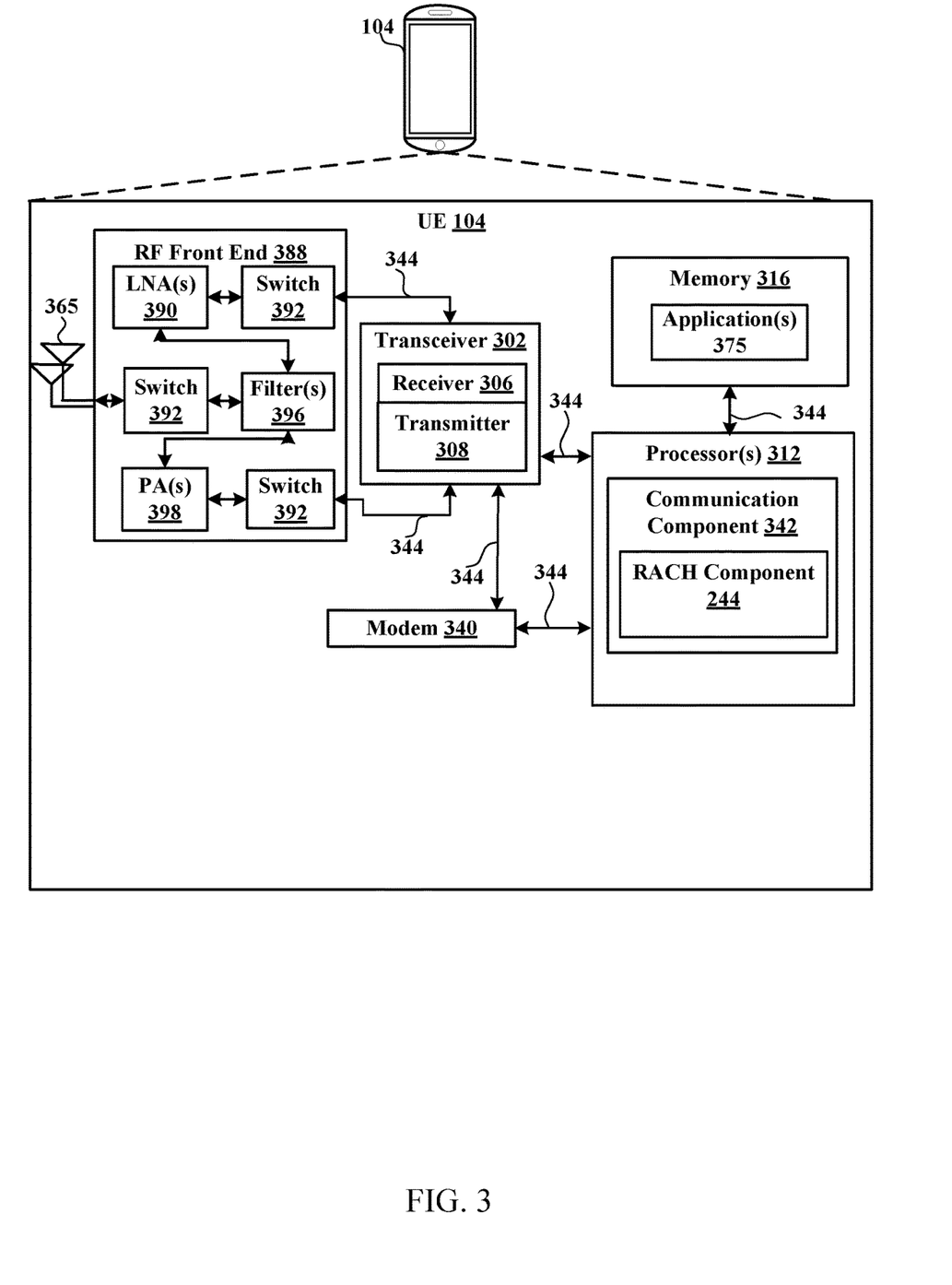
FIG. 3 is a block diagram illustrating an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340 and/or communication component 342 including RACH component 244 for facilitating RACH procedure in an NR-U communication system.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of base station 102, as described above, but configured or otherwise programmed for base station operations as opposed to base station operations.

In an aspect, the processor(s) 312 may correspond to one or more of the processors described in connection with the base station in FIG. 8. Similarly, the memory 316 may correspond to the memory described in connection with the base station in FIG. 8.

Figure 4:
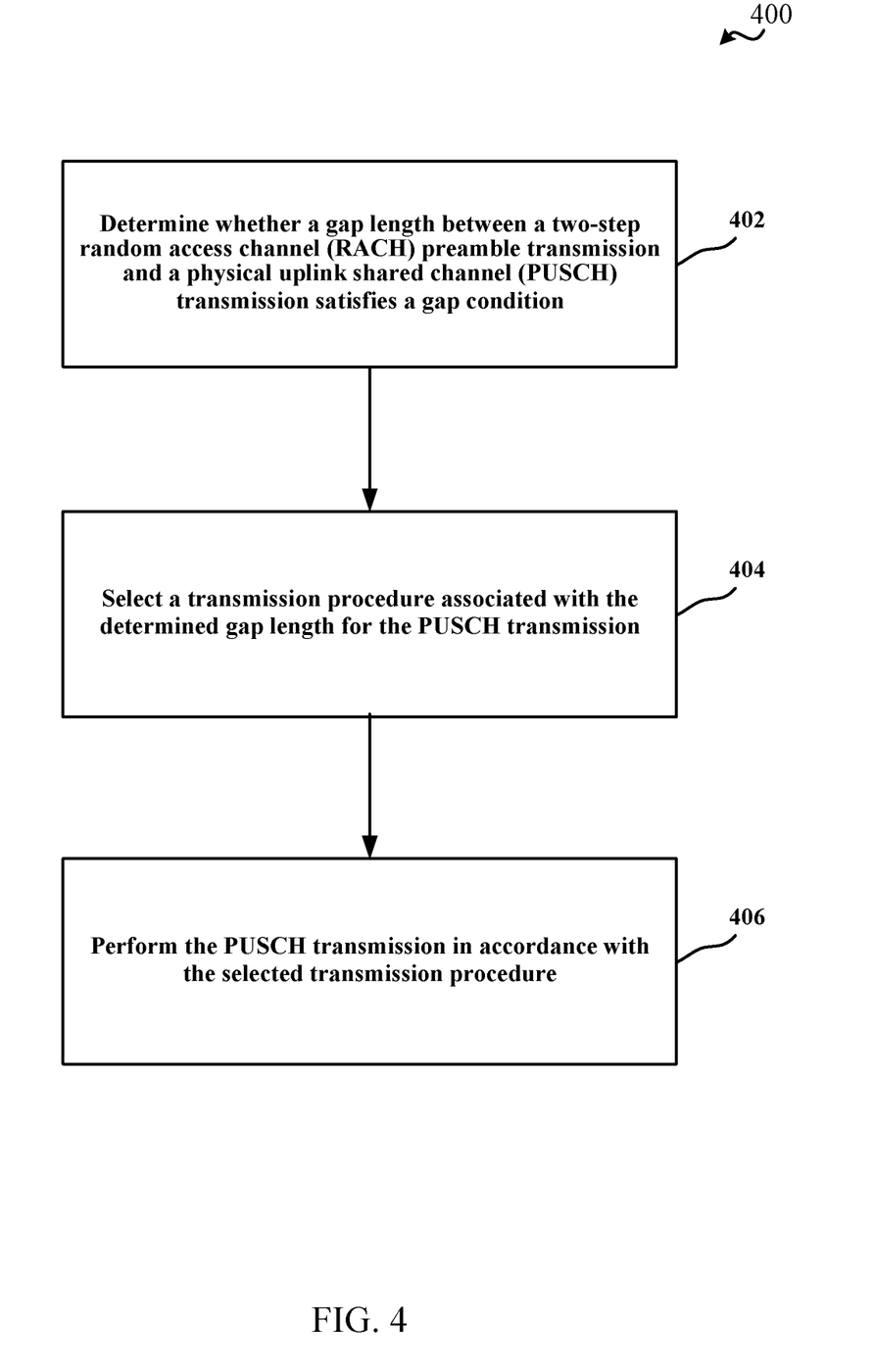
FIG. 4 is a flow chart illustrating an example of a method for wireless communications at a UE, in accordance with various aspects of the present disclosure.

FIG. 4 illustrates a flow chart of an example of a method 400 for wireless communication at a UE. In an example, a UE 104 can perform the functions described in method 400 using one or more of the components described in FIGS. 1, 3, and 8.

At block 402, the method 400 may determine whether a gap length between a two-step random access channel (RACH) preamble transmission and a physical uplink shared channel (PUSCH) transmission satisfies a gap condition. In an aspect, the communication component 342 including the RACH component 244, e.g., in conjunction with processor(s) 312, memory 316, and/or transceiver 302, may be configured to determine whether a gap length between a two-step random access channel (RACH) preamble transmission and a physical uplink shared channel (PUSCH) transmission satisfies a gap condition, as described herein in more detail. Thus, the UE 104, the processor(s) 312, the communication component 342 or one of its subcomponents may define the means for determining whether a gap length between a two-step random access channel (RACH) preamble transmission and a physical uplink shared channel (PUSCH) transmission satisfies a gap condition.

In some aspects, the gap condition may correspond to a gap less than one symbol gap, and the selected transmission procedure at least partially fills the gap with a cyclic prefix extension of a first symbol of the PUSCH transmission.

In some aspects, a remaining gap length may be less than 16 microseconds.

In some aspects, the gap condition may correspond to a gap greater than two symbols, and the selected transmission procedure perform a Category 4 LBT within the gap prior to the PUSCH transmission.

In some aspects, the gap condition may correspond to a gap greater than 1 symbol and less than two symbols, and the selected transmission procedure renders the two-step RACH transmission and the PUSCH transmission as invalid.

In some aspects, the gap length may be measured from a last non-zero sample from the two-step RACH preamble transmission to a beginning of the PUSCH transmission.

At block 404, the method 400 may select a transmission procedure associated with the determined gap length for the PUSCH transmission. In an aspect, the communication component 342 including the RACH component 244, e.g., in conjunction with processor(s) 312, memory 316, and/or transceiver 302, may be configured to select a transmission procedure associated with the determined gap length for the PUSCH transmission. For example, the communication component 342 may exclude the set of one or more resources 246 from a set of resources to be used for both the uplink transmission and the downlink transmission, as described above in more detail. Thus, the UE 104, the processor(s) 312, the communication component 342 or one of its subcomponents may define the means for selecting a transmission procedure associated with the determined gap length for the PUSCH transmission.

At block 406, the method 400 may perform the PUSCH transmission in accordance with the selected transmission procedure. In an aspect, the communication component 342 including the RACH component 244, e.g., in conjunction with processor(s) 312, memory 316, and/or transceiver 302, may be configured to perform the PUSCH transmission in accordance with the selected transmission procedure. Thus, the UE 104, the processor(s) 312, the communication component 342 or one of its subcomponents may define the means for performing the PUSCH transmission in accordance with the selected transmission procedure.

In some aspects, performing the PUSCH transmission may include configuring the PUSCH transmission with a PRACH format C2, and a first symbol of the PUSCH transmission overlaps with a last symbol of the PRACH format C2.

The method 400 may further include determining that gap cannot be at least partially filled with the cyclic prefix extension and rendering at least one resource associated with the gap as invalid.

The method 400 may further include identifying a location of a transient period, the transient period representing a potential degradation of waveform quality over a number of samples.

In some aspects, the location of the transient period may be at a beginning of the PUSCH transmission.

In some aspects, the location of the transient period may be at an end of the two-step RACH preamble transmission.

In some aspects, the location of the transient period may be a function of a configuration of the PUSCH transmission and a format of the two-step RACH preamble transmission.

Figure 5:
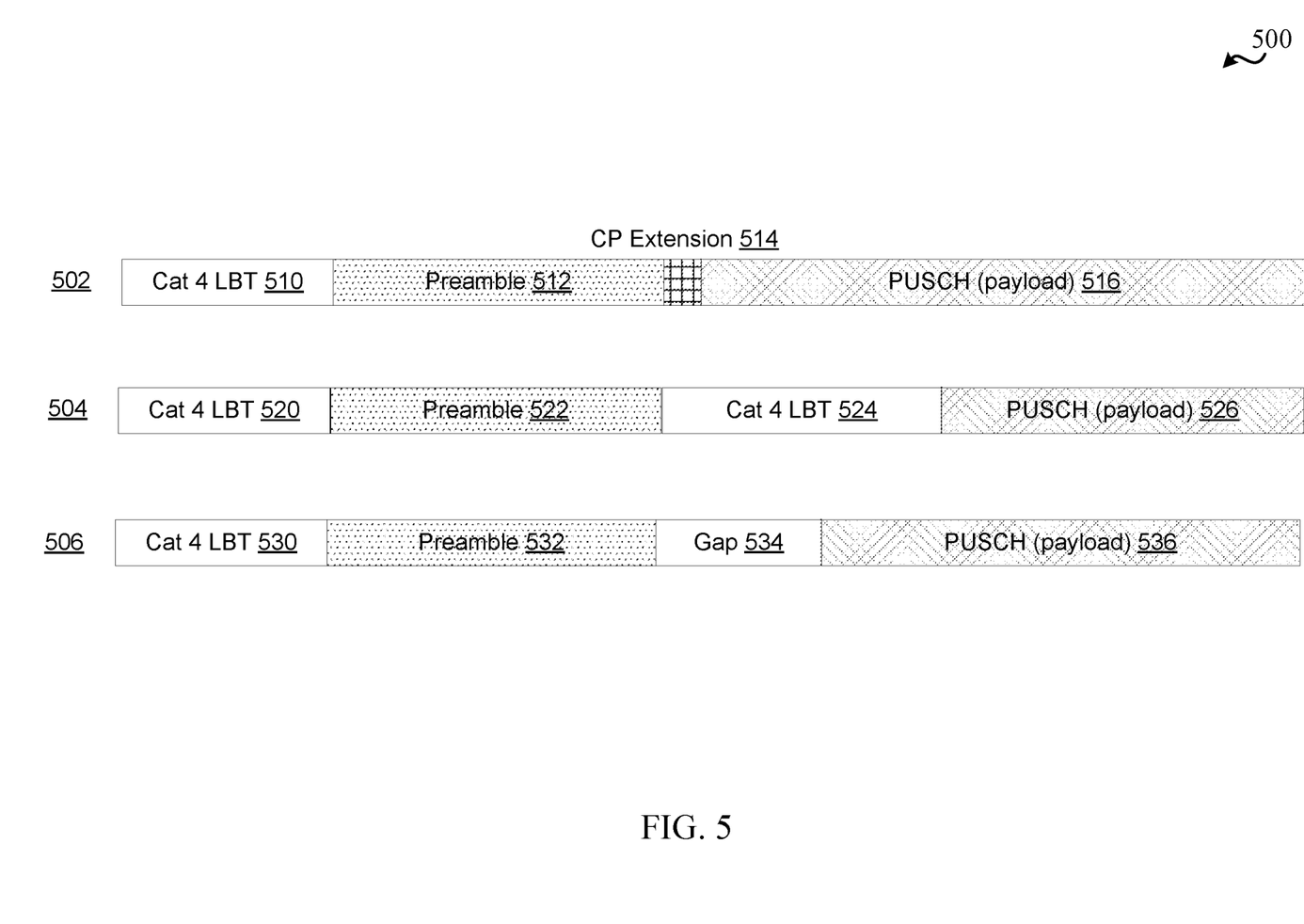
FIG. 5 is a conceptual diagram of example two-step preamble and PUSCH resource transmission scenarios, in accordance with various aspects of the present disclosure.

FIG. 5 is a conceptual diagram of example two-step preamble and PUSCH resource transmission scenarios 500. In a first transmission implementation 502, resources may be allocated for a Category 4 LBT 510, a preamble transmission 512, a cyclic prefix (CP) extension 514, and a PUSCH (payload) transmission 516. For example, if there is less than one symbol gap between the end of the preamble transmission 512 and the beginning of the PUSCH transmission 516 for a configured two-step preamble and PUSCH resource, the preamble transmission 512 and PUSCH transmission 516 can be supported with one Category 4 LBT 510 before the preamble transmission 512. Further, the PUSCH transmission 516 can use the CP extension 514 to fill in the gap to make the gap less than 16 microseconds, or fill to zero.

In a second transmission implementation 504, resources may be allocated for a first Category 4 LBT 520, a preamble transmission 522, a second Category 4 LBT 524, and a PUSCH (payload) transmission 526. For instance, if there is no less than a two symbol gap between the end of the preamble transmission 522 and the beginning of the PUSCH transmission 526 for a configured 2-step preamble and PUSCH (payload) resource, the preamble transmission 522 and PUSCH transmission 526 can be supported with two separate Category 4 LBTs before the preamble transmission 522, and before the PUSCH transmission 526. In this implementation, if the UE aims to send lower priority data in the PUSCH transmission 526 (e.g., so the contention window is longer), the second Category 4 LBT 524 may not pass for the PUSCH transmission 526, but does not render the resource pair or configuration as invalid.

In a third transmission implementation 506, resources may be allocated for a first Category 4 LBT 530, a preamble transmission 532, a gap 534, and a PUSCH (payload) transmission 536. For example, the UE may not expect a configuration of two-step preamble and PUSCH resources due to the gap between the end of the preamble transmission 532 and the beginning of the PUSCH transmission 536 being between one symbol and two symbols. In this implementation, the UE may not have the time to perform a second Category 4 LBT and may not fill the gap to not perform a LBT for the second burst. On the other hand, the UE may designate the two-step RACH resource within the gap 534 as invalid for not being of sufficient length for a Category 4 LBT, while other two-step RACH resource pairs in the same configuration may still be valid if the condition is satisfied. This condition may refer to an instance where the gap 534 between corresponding PRACH and PUSCH is sufficiently large enough for a Category 4 occurrence between the transmissions.

Figure 6:
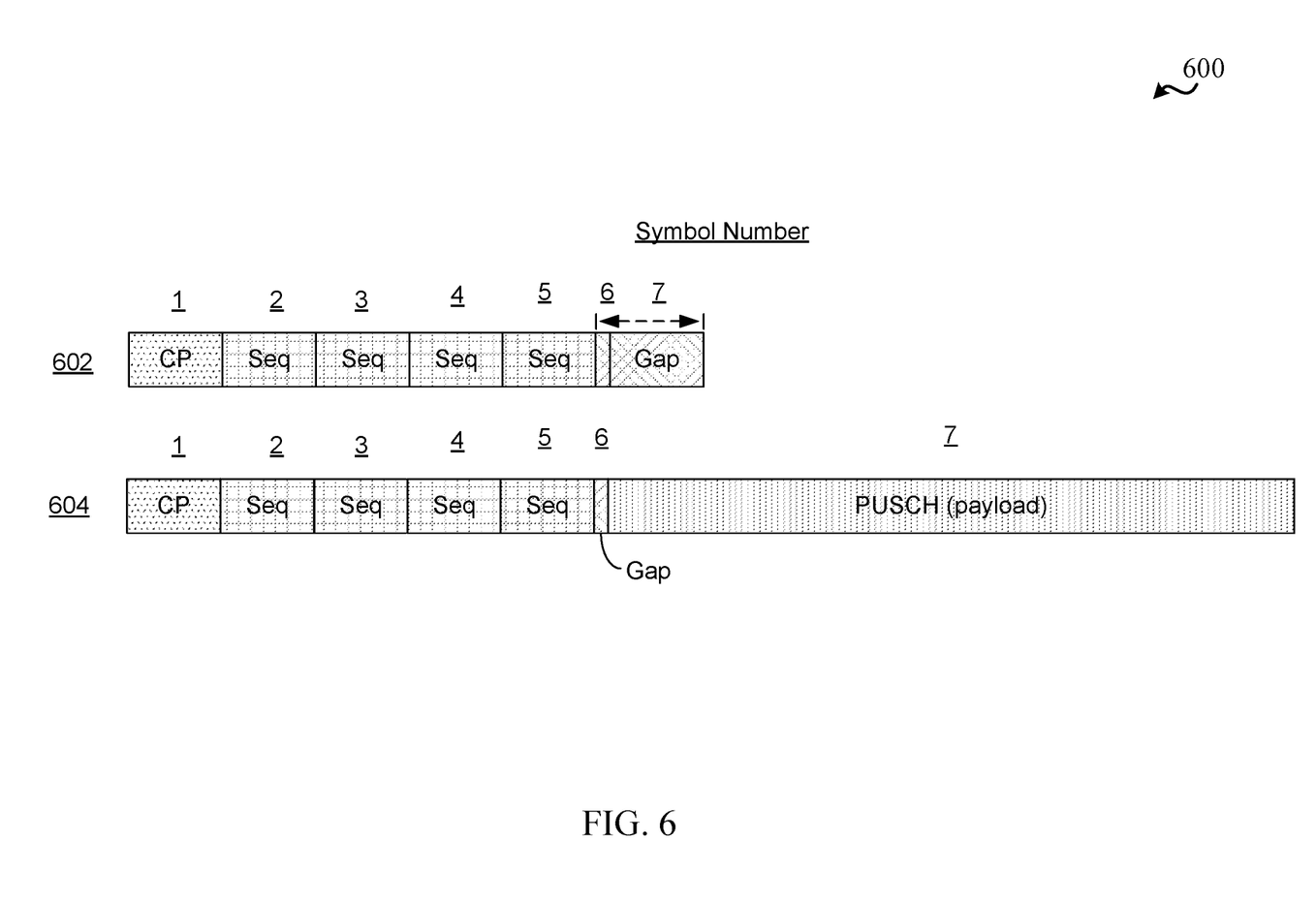
FIG. 6 is a conceptual diagram of a PRACH format C2 scenario, in accordance with various aspects of the present disclosure.

FIG. 6 is a conceptual diagram of example PRACH formats 600. In a first example PRACH format 602, which may also be referred to as a C2 format, a CP may be followed by a number of PRACH sequences, and a gap of slightly more than one symbol may be allocated at an end of the format. Other formats such as A1, A2, A3, B1, B2, B3, B4, and C0 either have no gap or have a gap less than one symbol. A C2 format may corresponds to a PRACH format in NR. A sequence may refer to one of a length of 139 sequences for PRACH. The sequence may be repeated multiple times depending on format, and four times for the C2 format.

In a second example PRACH format 604, a CP may be followed by a number of PRACH sequences, a gap of less than one symbol, and a PUSCH payload at the end of the format. In the second PRACH format 604, a PUSCH configuration for a two-step RACH may be permitted to start from the sixth symbol. The transmission of the PUSCH may occur before the second PRACH format 604 (C2) ends, but may occur after the second PRACH format 604 (C2)transmission ends.

Figure 7:
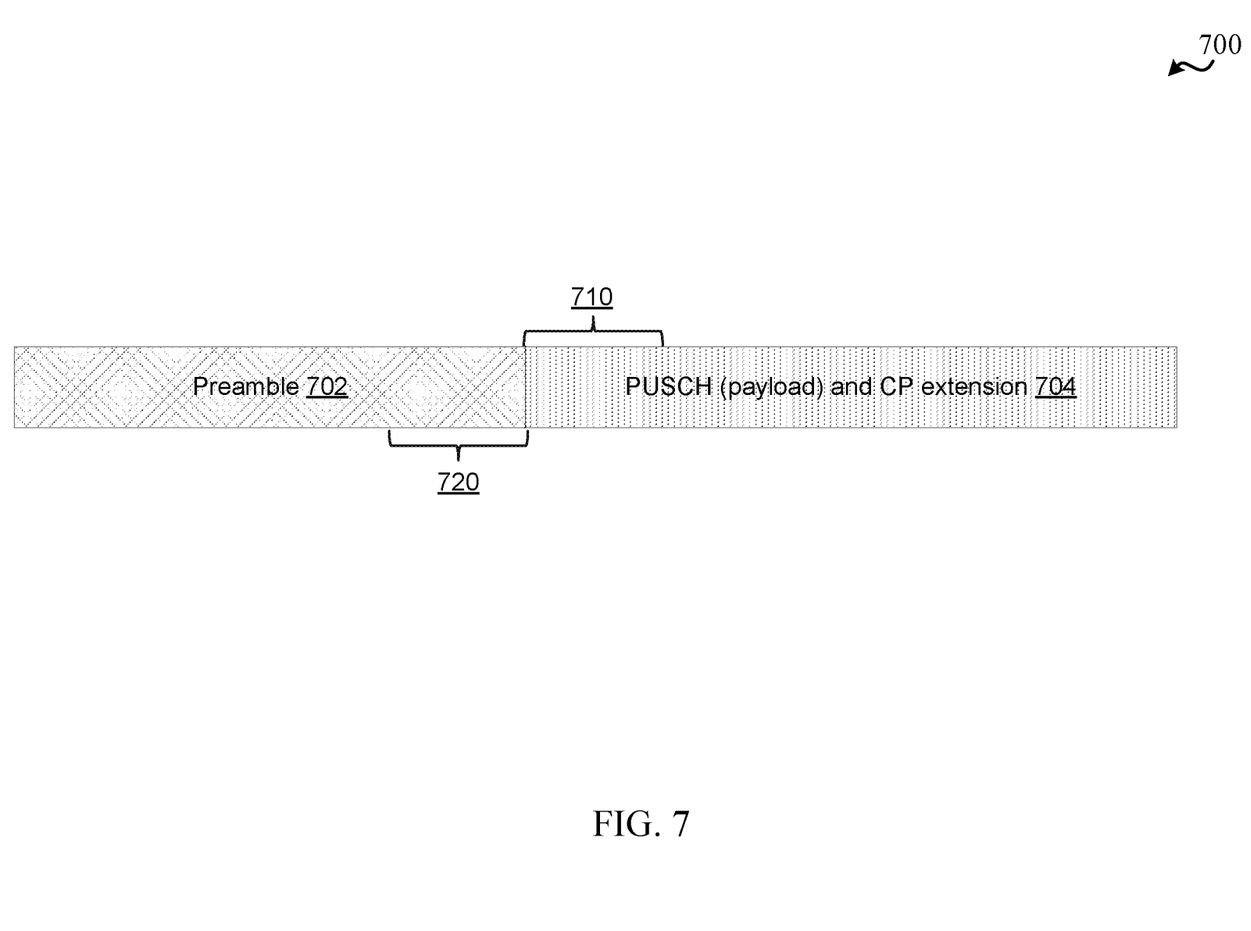
FIG. 7 is a conceptual diagram of a Transient period between preamble and PUSCH scenario, in accordance with various aspects of the present disclosure.

FIG. 7 is a conceptual diagram of example transient periods between preamble and PUSCH transmissions 700. For example, a transient period may be allocated between the preamble 702 and the PUSCH 704 to mitigate waveform degradations. Specifically, a transmit power and transmission bandwidth of the preamble 702 and the PUSCH 704 may be different. When the preamble 702 and PUSCH 704 transmissions are adjacent or back-to-back, due to the difference in transmit power and transmission bandwidth, there may be a transient period during which the generated waveform quality can be degraded (i.e., 10 microseconds of transient window).

In a first transient period 710, the transient period in the PUSCH 704 or a corresponding CP extension may be maintained along with the preamble 702. If the preamble is not detected properly, the PUSCH 704 decoding may not be attempted. The network entity (i.e., gNB) may prefer to configure type A PUSCH so the demodulation reference signal (DMRS) is not front loaded to reduce the impact to PUSCH decoding.

In a second transient period 720, the transient period may be maintained within the preamble 702. For example, the transient period may be in the preamble 702 if the preamble is relatively long (e.g., with many repetitions) and when the PUSCH 704 has a front loaded DMRS.

In a third transient period, the location of the transient period may be a function of PUSCH configuration (e.g., DMRS front loading or not) and the preamble format (e.g., number of sequence repetitions). As such, the location of the transient period may be dependent based on the PUSCH configuration and preamble format. The transient period may be a time duration that the transmitted signal waveform quality is degraded due to loop converges. The examples provide which waveform (preamble or PUSCH or both) may allow some waveform quality degradation. The transient period may overlap both preamble and PUSCH. In other words, a part of preamble and PUSCH may be used as transient period. In some implementations, transient period may be either a preamble or PUSCH, but not both.

Some UEs may be capable of sending the preamble 702 and the PUSCH 704 within two symbols (e.g., UE capability). In such case, the two-step RACH configuration may have some RACH occasions (RO) or PUSCH pairs that may be within two symbols from each other and some RO or PUSCH pairs that may not be within two symbols. Nonetheless, all these resources pairs may be valid. Synchronization signal block (SSB) to RO or PUSCH pair associations may be performed over all valid RO or PUSCH pairs. The low capability UE can use the resource pairs at least two symbols apart.

Figure 8:
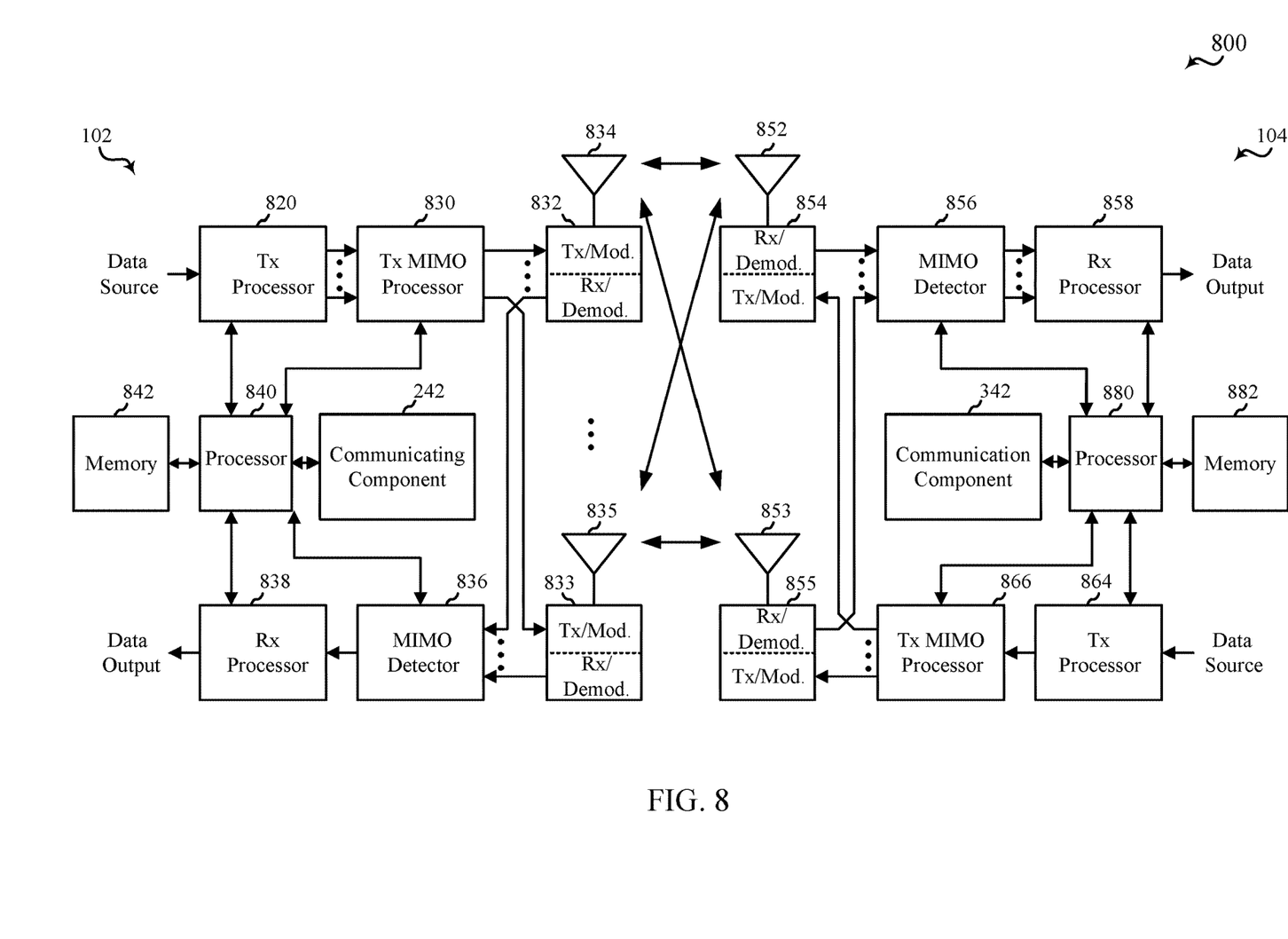
FIG. 8 is a block diagram illustrating an example of a MIMO communication system including a base station and a UE, in accordance with various aspects of the present disclosure.

FIG. 8 is a block diagram of a MIMO communication system 800 including a base station 102 and a UE 104. The MIMO communication system 800 may illustrate aspects of the wireless communication access network 100 described with reference to FIG. 1. The base station 102 may be an example of aspects of the base station 102 described with reference to FIG. 1. The base station 102 may be equipped with antennas 834 and 835, and the UE 104 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 104 may be an example of aspects of the UEs 104 described with reference to FIGS. 1 and 2. At the UE 104, the UE antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104 to a data output, and provide decoded control information to a processor 880, or memory 882.

The processor 880 may in some cases execute stored instructions to instantiate a communicating component 242 (see e.g., FIGS. 1 and 2).

On the uplink (UL), at the UE 104, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the base station 102 in accordance with the communication parameters received from the base station 102. At the base station 102, the UL signals from the UE 104 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The processor 880 may in some cases execute stored instructions to instantiate a communicating component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 1400. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 1400.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications at a user equipment (UE), comprising: determining, by the UE, whether a gap length between a two-step random access channel (RACH) preamble transmission and a physical uplink shared channel (PUSCH) transmission satisfies a gap condition; selecting a transmission procedure associated with the determined gap length for the PUSCH transmission, wherein the selected transmission procedure at least partially fills the gap with a cyclic prefix extension of a first symbol of the PUSCH transmission; performing the PUSCH transmission in accordance with the selected transmission procedure; and further comprising identifying a location of a transient period, the transient period representing a potential degradation of waveform quality over a number of samples wherein the location of the transient period is a function of a configuration of the PUSCH transmission and a format of the two-step RACH preamble transmission.

2. The method of claim 1, wherein the gap condition corresponds to a gap less than one symbol gap.

3. The method of claim 2, further comprising:
determining that gap cannot be at least partially filled with the cyclic prefix extension; and
rendering at least one resource associated with the gap as invalid.

4. The method of claim 2, wherein a remaining gap length is less than 16 microseconds.

5. The method of claim 1, wherein the gap condition corresponds to a gap greater than two symbols, and the selected transmission procedure performs a Category 4 listen-before-talk (LBT) within the gap prior to the PUSCH transmission.

6. The method of claim 1, wherein the gap condition corresponds to a gap greater than one symbol and less than two symbols, and the selected transmission procedure renders the two-step RACH transmission and the PUSCH transmission as invalid.

7. The method of claim 1, wherein the gap length is measured from a last non-zero sample from the two-step RACH preamble transmission to a beginning of the PUSCH transmission.

8. The method of claim 1, wherein performing the PUSCH transmission includes configuring the PUSCH transmission with a physical random access channel (PRACH) format C2, and wherein a first symbol of the PUSCH transmission overlaps with a last symbol of the PRACH format C2.

9. The method of claim 1, wherein the location of the transient period is at a beginning of the PUSCH transmission.

10. The method of claim 1, wherein the location of the transient period is at an end of the two-step RACH preamble transmission.

11. An apparatus for wireless communication at a user equipment (UE), comprising: a transceiver; a memory configured to store instructions; and at least one processor communicatively coupled with the transceiver and the memory, wherein the at least one processor is configured to: determine, by the UE, whether a gap length between a two-step random access channel (RACH) preamble transmission and a physical uplink shared channel (PUSCH) transmission satisfies a gap condition; select a transmission procedure associated with the determined gap length for the PUSCH transmission, wherein the selected transmission procedure at least partially fills the gap with a cyclic prefix extension of a first symbol of the PUSCH transmission; perform the PUSCH transmission in accordance with the selected transmission procedure; and wherein the at least one processor is further configured to identify a location of a transient period, the transient period representing a potential degradation of waveform quality over a number of samples wherein the location of the transient period is a function of a configuration of the PUSCH transmission and a format of the two-step RACH preamble transmission.

12. The v apparatus of claim 11, wherein the gap condition corresponds to a gap less than one symbol gap.

13. The apparatus of claim 12, wherein the at least one processor is further configured to:
determine that gap cannot be at least partially filled with the cyclic prefix extension; and
render at least one resource associated with the gap as invalid.

14. The apparatus of claim 12, wherein a remaining gap length is less than 16 microseconds.

15. The v apparatus of claim 11, wherein the gap condition corresponds to a gap greater than two symbols, and the selected transmission procedure perform a Category 4 listen-before-talk (LBT) within the gap prior to the PUSCH transmission.

16. The apparatus of claim 11, wherein the gap condition corresponds to a gap greater than one symbol and less than two symbols, and the selected transmission procedure renders the two-step RACH transmission and the PUSCH transmission as invalid.

17. The v of claim 11, wherein the gap length is measured from a last non-zero sample from the two-step RACH preamble transmission to a beginning of the PUSCH transmission.

18. The apparatus of claim 11, wherein to perform the PUSCH transmission, the at least one processor is further configured to configure the PUSCH transmission with a physical random access channel (PRACH) format C2, and wherein a first symbol of the PUSCH transmission overlaps with a last symbol of the PRACH format C2.

19. The method of claim 11, wherein the location of the transient period is at a beginning of the PUSCH transmission.

20. The method of claim 13, wherein the location of the transient period is at an end of the two-step RACH preamble transmission.

21. An apparatus for wireless communication at a user equipment (UE), comprising: means for determining, by the UE, whether a gap length between a two-step random access channel (RACH) preamble transmission and a physical uplink shared channel (PUSCH) transmission satisfies a gap condition; means for selecting a transmission procedure associated with the determined gap length for the PUSCH transmission, wherein the selected transmission procedure at least partially fills the gap with a cyclic prefix extension of a first symbol of the PUSCH transmission; means for performing the PUSCH transmission in accordance with the selected transmission procedure; and means for identifying a location of a transient period, the transient period representing a potential degradation of waveform quality over a number of samples wherein the location of the transient period is a function of a configuration of the PUSCH transmission and a format of the two-step RACH preamble transmission.

22. The apparatus of claim 21, wherein the gap condition corresponds to a gap less than one symbol gap.

23. The apparatus of claim 22, further comprising:
means for determining that gap cannot be at least partially filled with the cyclic prefix extension; and
means for rendering at least one resource associated with the gap as invalid.

24. A non-transitory computer-readable medium storing code executable by one or more processors to: determine, by a user equipment (UE), whether a gap length between a two-step random access channel (RACH) preamble transmission and a physical uplink shared channel (PUSCH) transmission satisfies a gap condition; select a transmission procedure associated with the determined gap length for the PUSCH transmission, wherein the selected transmission procedure at least partially fills the gap with a cyclic prefix extension of a first symbol of the PUSCH transmission; perform the PUSCH transmission in accordance with the selected transmission procedure; and identify a location of a transient period, the transient period representing a potential degradation of waveform quality over a number of samples wherein the location of the transient period is a function of a configuration of the PUSCH transmission and a format of the two-step RACH preamble transmission.

25. The non-transitory computer-readable medium of claim 24, wherein the gap condition corresponds to a gap less than one symbol gap.

26. The non-transitory computer-readable medium of claim 25, further comprising executable by one or more processors to:
determine that gap cannot be at least partially filled with the cyclic prefix extension; and
render at least one resource associated with the gap as invalid.

* * * * *